US006798881B2

(12) United States Patent
Thomasson (10) Patent No.: US 6,798,881 B2
(45) Date of Patent: *Sep. 28, 2004

(54) NOISE REDUCTION CIRCUIT FOR TELEPHONES

(75) Inventor: Samuel L. Thomasson, Gilbert, AZ (US)

(73) Assignee: Acoustic Technologies, Inc., Mesa, AZ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,864

(22) Filed: Jun. 7, 1999

(65) Prior Publication Data

US 2001/0040963 A1 Nov. 15, 2001

(51) Int. Cl.[7] ............................................. H04M 9/08
(52) U.S. Cl. ............................ 379/406.07; 379/406.14
(58) Field of Search ................................. 379/343–346, 379/347, 387–392, 395, 403, 406–407, 409–411, 420; 381/56–57, 98, 102, 104, 106; 333/242; 330/109; 370/288–290

(56) References Cited

U.S. PATENT DOCUMENTS

| | | | | |
|---|---|---|---|---|
| 3,567,873 A | * | 3/1971 | Peroni | 379/406.07 |
| 3,699,271 A | * | 10/1972 | Berkley et al. | 379/406.07 |
| 3,900,708 A | * | 8/1975 | Bendel | 379/406.06 |
| 4,029,912 A | * | 6/1977 | Geigel et al. | 379/406.07 |
| 4,225,834 A | * | 9/1980 | Van Doorn | 333/242 |
| 4,991,167 A | | 2/1991 | Petri et al. | 370/32.1 |
| 5,170,430 A | * | 12/1992 | Schuh | 379/389 |
| 5,280,525 A | * | 1/1994 | Wesel | 379/406 |
| 5,386,465 A | | 1/1995 | Addeo et al. | 379/202 |
| 5,640,450 A | * | 6/1997 | Watanabe | 379/392 |
| 5,668,794 A | * | 9/1997 | McCaslin et al. | 379/406.07 |
| 5,668,871 A | * | 9/1997 | Urbanski | 379/410 |
| 5,721,730 A | * | 2/1998 | Genter | 370/288 |
| 5,787,165 A | * | 7/1998 | Lilja et al. | 379/390 |

* cited by examiner

Primary Examiner—George Eng
(74) Attorney, Agent, or Firm—Paul F. Wille (57) ABSTRACT

A system for processing audio signals in two channels, wherein each channel includes a plurality of band pass filters for dividing the signal in each channel into a plurality of bands and a plurality of variable gain amplifiers coupled one each to a band pass filter. Control logic coupled to the variable gain amplifiers prevents the signals in adjacent bands within a channel from being attenuated simultaneously. The control logic attenuates the signals in one channel in accordance with the signal in the corresponding bands in the other channel. In some circumstances, the signal in the band in the one channel is attenuated.

12 Claims, 8 Drawing Sheets

NOISE REDUCTION CIRCUIT FOR TELEPHONES

BACKGROUND OF THE INVENTION

This invention relates to a noise reduction circuit and, in particular, to a noise reduction circuit employing a plurality of channels in a band wherein the gain of a channel in controlled in accordance with the signals in certain of the other channels and wherein "noise" means unwanted sounds, such as echoes, background speech or music, and random sounds.

Virtually since the invention of the telephone, techniques have been developed to improve the clarity of the sound reproduced at each station. There are a number of techniques but two are of particular interest. A first uses what is known as a comb filter; i.e. a plurality of filters wherein band pass filters alternate with band stop filters. Comb filters with complementary pass and stop bands are coupled in the two audio channels connecting the two stations of a telephone call. That is, the pass bands in one channel are the stop bands in the other channel. As a result, a signal traveling in one direction will be slightly attenuated but a signal traveling in a loop, i.e. an echo, will encounter both sets of stop bands and be highly attenuated.

The use of the complementary comb filters reduces the acoustic coupling between the speaker and microphone at each station as well as inter-station echo. Echo canceling circuits, which try to recognize a delayed signal as an echo, are much more complicated than complementary comb filter circuits and the two are often used together to eliminate echoes and other noises. However, comb filters degrade the quality of speech and do not always provide a sufficient margin of acoustic stability. One reason for the degradation is that the frequency response of a room in which the microphone and speaker of a station are located is characterized by a large number of resonant peaks. The band transitions in the comb filter transfer functions are often not sharp enough to suppress the resonant peaks, because if the transitions are too sharp the quality of the transmitted audio signal is adversely affected.

Figure 4:
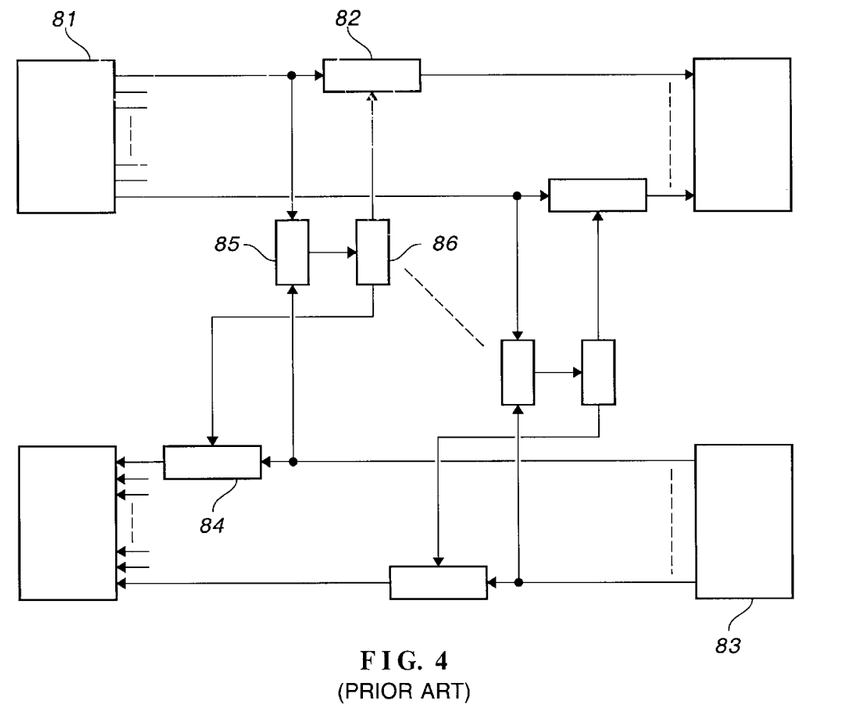
FIG. 4 is a filter system of the prior art based upon U.S. Pat. No. 4,991,167.

Complementary comb filter circuits are disclosed in U.S. Pat. No. 5,386,465 (Addeo et al.). This patent includes complementary comb filters in combination with other apparatus for processing audio signals to reduce noise. U.S. Pat. No. 4,991,167 (Petri et al.) discloses a slightly different system, illustrated in FIG. 4. Signals in the transmit direction are separated by filter block 80 into a set of bands, each including an attenuator, such as attenuator 82. Similarly, signals in the receive direction are separated by filter block 83 into the same set of bands, each including an attenuator, such as attenuator 84. The signals in the corresponding transmit band and receive band are compared, such as in comparator 85. The band with the smaller signal is attenuated by control circuit 86. Thus, the transmit and receive bands are paired and there is no logic interconnecting the control circuits for each pair.

Figure 5:
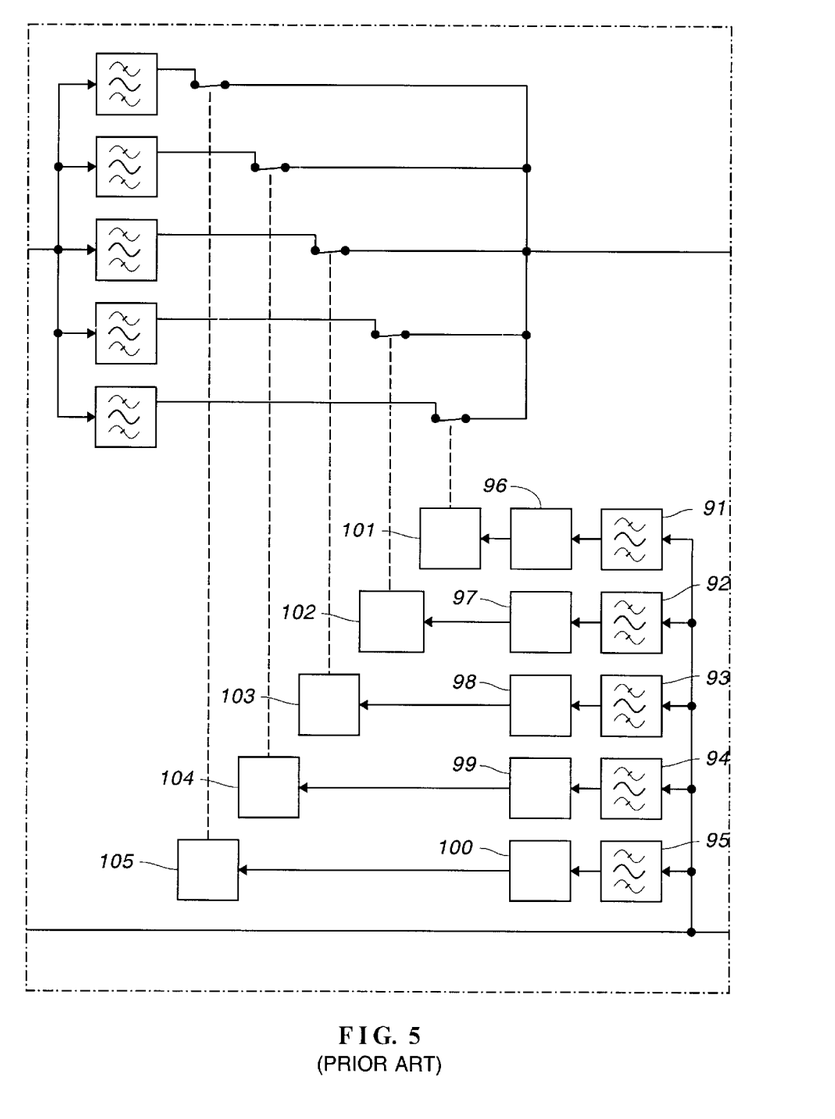
FIG. 5 is a filter system of the prior art based upon U.S. Pat No. 3,567,873.

Another variation on the comb filter is disclosed in U.S. Pat. No. 3,567,873 (Peroni), illustrated in FIG. 5. In this patent, the receive signal is passed through a filter bank, represented by filters 91, 92, 93, 94, and 95. The signals in each subband is compared with a threshold in level detectors 96, 97, 98, 99, and 100, respectively. Relays 101, 102, 103, 104, and 105 close their respective contacts for each band of the received signal that exceeds its threshold. In an alternative embodiment, a second set of contacts is included in the receive channel and operated oppositely from the first set from the first set. As with the Petri patent, there is no control logic looking at all the sub-bands in both channels.

A problem with these approaches is that, unlike the complementary comb filters, one can attenuate the signals in adjacent bands, thereby noticeably degrading the quality of the voice transmission. In the extreme, the telephone is reduced to "half duplex" or simplex operation, i.e. single direction at a time because sounds from the other station are inaudible. The speaker at one station must stop and the circuits must re-settle before the person at the other station can be heard.

Although a complementary comb filter can attenuate an echo, current implementations of such filters cannot suppress the "tail" of the echo, i.e. an extended echo. The prior art can only eliminate an echo lasting a maximum of fifty milliseconds. It is desired to eliminate an echo lasting up to fifteen hundred milliseconds.

In view of the foregoing, it is therefore an object of the invention to provide a noise reducing circuit that retains the advantages of a complementary comb filter without the signal degradation.

Another object of the invention is to provide an improved technique for selectively attenuating bands in an audio communication system.

A further object of the invention is to provide a circuit that can eliminate echo tails up to fifteen hundred milliseconds in length.

Another object of the invention is to provide a circuit that can reduce both background noise and echo noise while maintaining full duplex communication.

SUMMARY OF THE INVENTION

The foregoing objects are achieved in this invention in which signals in the sending and receiving channels are each separated into a set of bands, each including a variable gain amplifier. The amplitude of a signal in a band in a first channel is controlled as a function of the amplitude of the signals in the corresponding band and the two adjacent bands in a second channel. Attenuation for echoes is restricted to alternate bands. Under certain conditions, a signal in the first channel is attenuated.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
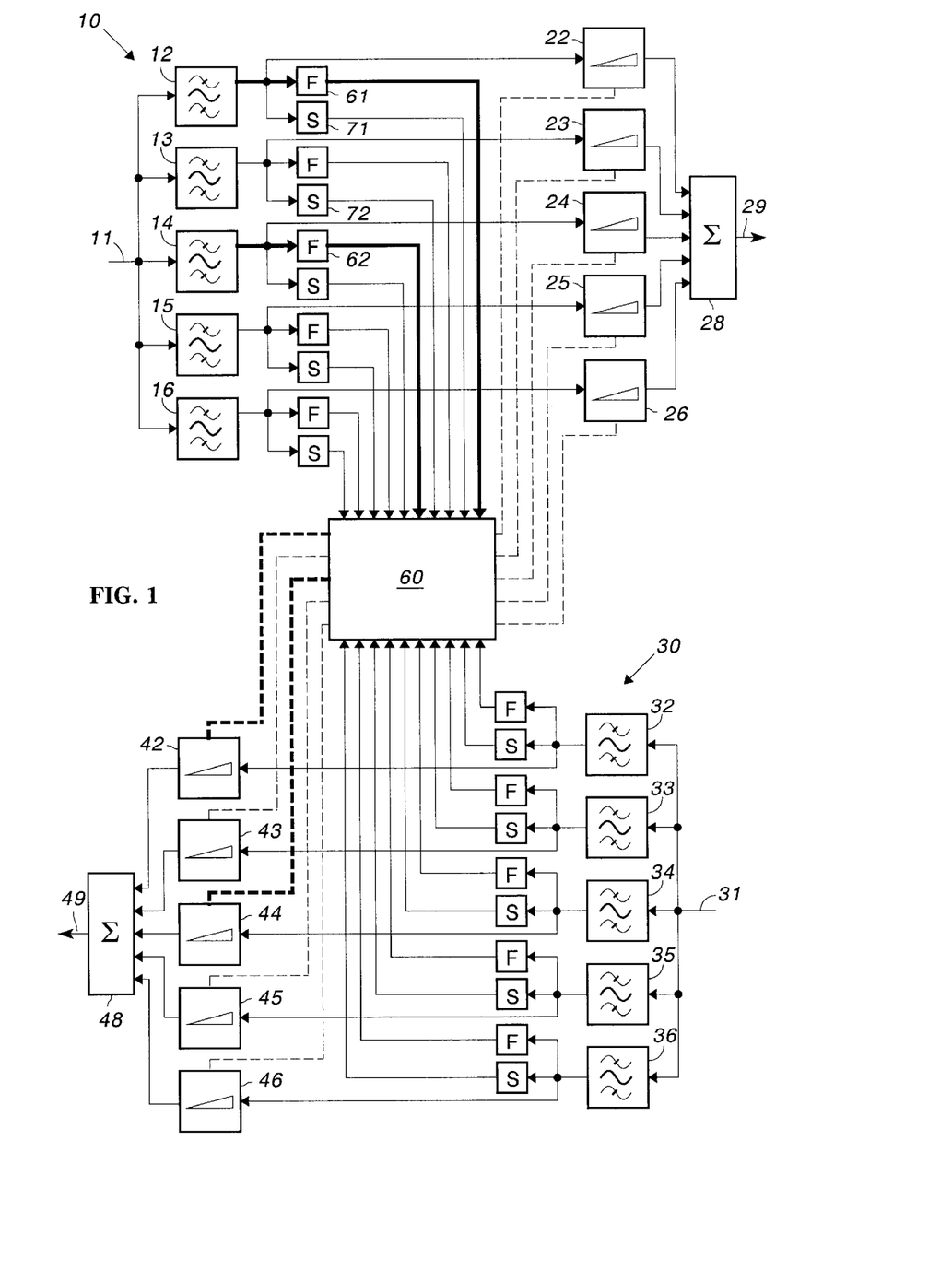
FIG. 1 is a block diagram of a preferred embodiment of the invention and illustrates the response to a first sound pattern.

In FIG. 1, the upper half of the figure illustrates a first channel affecting the transmitted signal or the signal from a microphone (not shown) and the lower half of the figure illustrates a second channel affecting the received signal or the signal going to the earpiece of a telephone or to the speaker in a conferencing telephone.

In addition to other processing, such as echo cancellation and weighting the inputs, the signal from a microphone is applied to input 11 and coupled to a plurality of band pass filters 12, 13, 14, 15, and 16. Although five filters are shown, performance is improved with more filters. In one embodiment of the invention, ten $\frac{1}{7}$ octave filters were used for each channel. The bandwidths of the filters are not identical but vary with frequency. That is, at 3,400 Hz, the bandwidth is about $\frac{1}{3}$ or $\frac{1}{4}$ octave, whereas, at 300 Hz the bandwidth is $\frac{1}{7}$ octave. Either the inputs or the outputs of the filters are weighted to accommodate the fact that the human ear is more sensitive to signals at 3,000 Hz than at 300 Hz or at 10,000 Hz.

The filters are preferably switched capacitor, elliptical filters, known per se in the art. Other types of filters could be used instead but maximum performance might not be obtained. One reason a switched capacitor, elliptical filter was chosen is because the filters are easily matched in integrated circuit form and a filter in discrete form would be more expensive. The sampling rate of the filters is preferably above one hundred kHz, which enables the system to detect and remove echo tails up to fifteen hundred milliseconds in length.

The outputs of the filters are coupled to variable gain amplifiers 22, 23, 24, 25, and 26, respectively, and the outputs of the variable gain amplifiers are combined in summing circuit 28 for transmission from output 29. The variable gain amplifiers are also known as programmable gain amplifiers.

The receiving side of the circuit is similarly constructed in that input 31 and coupled to a plurality of $\frac{1}{7}$ band pass filters, 32, 33, 34, 35, and 36. As with the upper portion of the circuit, only five filters are shown for the sake of simplicity. The outputs of the filters are coupled to variable gain amplifiers 42, 43, 44, 45, and 46, respectively, and the outputs of the variable gain amplifiers are combined in summing circuit 48 for transmission from output 49.

In each set of band pass filters, the bands are adjoining, not separated or alternating as in complementary comb filters of the prior art.

Transmitting channel 10 and receiving channel 30 operate independently except for control logic 60, which controls each variable gain amplifier. When the circuit is first turned on, each variable gain amplifier is set to unity gain. At unity gain, a signal on input 11 is divided into a plurality of bands by the band pass filters and then recombined, unaffected, in summing circuit 28. Similarly, a signal on input 31 is divided into a plurality of bands by the band pass filters and then recombined, unaffected, in summing circuit 48.

The output of each band pass filter is also coupled to a detector, such as detector 61 at the output of filter 12. Detector 61 senses the instantaneous or short term power of the signal and provides a suitable signal to control logic 60. Control logic 60 analyzes the information from all inputs and controls the attenuators accordingly. In particular, echoes are reduced by controlling the attenuators in one channel in accordance with the amplitude of the signal in a corresponding band in the other channel. Background noise is reduce by attenuating the signals in a channel in accordance with the amplitude of the signals in each band of that channel. Adjacent bands in a channel may not be attenuated fully, i.e. set to minimum gain/maximum attenuation. Secondly, maximum attenuation does not take place in the same band in both channels. Other combinations of events are discussed more fully below as specific examples of operation. In general, control logic 60 operates to minimize background noise and echo.

In FIG. 1, some lines are distinctly heavier, indicating a first combination of input signals and the resulting control signals produced by control logic 60. Some lines are dashed to indicate control by control logic 60 and other lines are solid to represent signal lines. For example, if the signal from band pass filter 12 and the signal from band pass filter 14 exceeded a predetermined amplitude for a short period of time, detectors 61 and 62 provide output signals to control logic 60 indicative of that fact. Control logic 60 then reduces the gain (attenuates) the signals in the corresponding bands of the other channel. Specifically, control logic 60 reduces the gain of amplifiers 42 and 44. Similarly, control logic 60 adjusts the gain of amplifiers 22, 23, 24, 25, and 26 in accordance with the outputs from the detectors in the lower channel.

Figure 2:
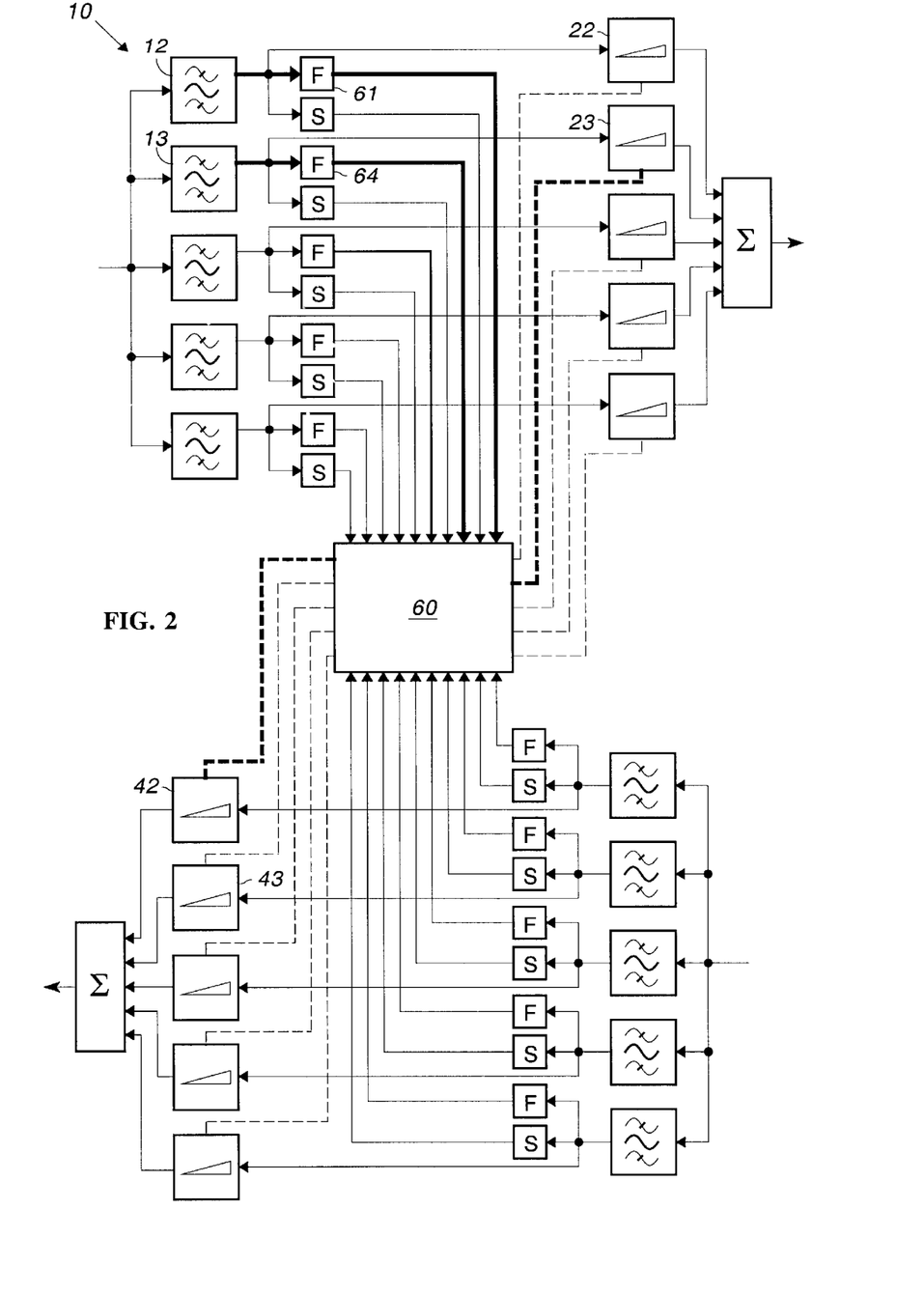
FIG. 2 is the same block diagram illustrating the response to a second sound pattern.

If, as illustrated in FIG. 2, the signal from band pass filter 12 and the signal from band pass filter 13 exceeded a predetermined amplitude for a short period of time, detectors 61 and 64 provide output signals to control logic 60 indicative of that fact. Now there is a problem because adjacent bands may not be attenuated. In accordance with the invention, the solution is to attenuate one band in one channel and the adjacent band in the other channel. Specifically, the gain of variable gain amplifier 42 is reduced and the gain of variable gain amplifier 23 is reduced.

The gain of either amplifier 22 or 42 can be reduced or the gain of either amplifier 23 or 43 can be reduced but not the gain of two amplifiers in adjacent bands in the same channel. The choice can be made arbitrarily by control logic 60, e.g. using a random number generator, or the choice can depend upon which amplitude is greater, the signal into detector 61 or into detector 64. For best signal to noise ratio, it is preferred not to attenuate the lesser of the two signals prior to transmission. Thus, choosing by amplitude is preferred. If the amplitudes are the same or are indistinguishable, then an arbitrary choice is made.

Figure 3:
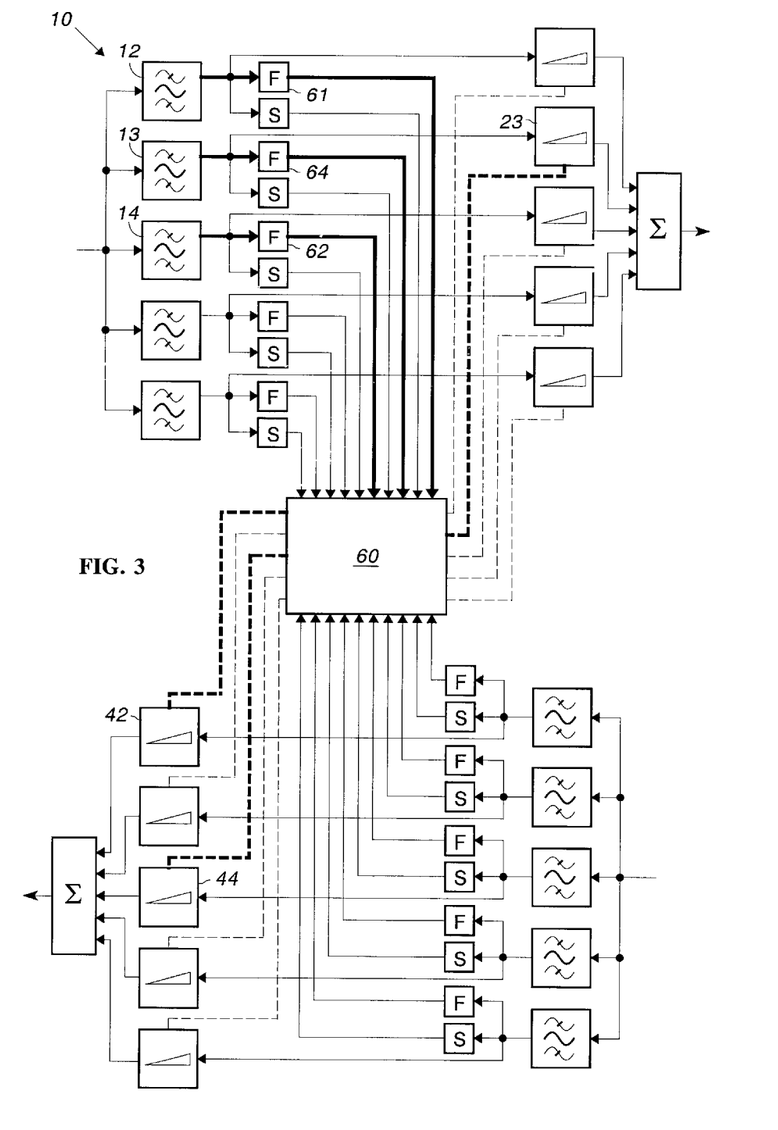
FIG. 3 is the same block diagram illustrating the response to a third sound pattern.

FIG. 3 illustrates a third situation in which the signals from filters 12, 13, and 14 all contain a substantial amount of power. In this situation, the first rule is applied to attenuate the signals in variable gain amplifiers 42 and 44. The second rule, attenuate the corresponding band in the other channel, is broken by reducing the gain of amplifier 23; i.e. by reducing the gain of the amplifier in the same channel. Unless the decision is further affected by other bands, the amplitude of the signal from filter 13 does not matter, as long as the amplitude exceeds a predetermined threshold, as determined by detector 64.

Detectors 71, 72, etc. (labeled "S") respond to signals with a long time constant, such as background noise in a room. The long term noise is factored into the amount of attenuation provided by the variable gain amplifiers to minimize noise in the system without corrupting the desired voice information. Unlike fast attack detectors 61, 62, and 64, slow attack detectors 71 and 72 affect the attenuation in the same channel as the detector, e.g. by 10 dB. A signal in the corresponding band in the other channel may cause control logic 60 to increase the attenuation to 40 dB, for example. For a relatively quiet room, there may be zero attenuation due to background noise. For a noisy room, the attenuation may be 10 dB or even 20 dB to minimize background noise. Thus, a single channel addresses background noise and two channels address echo noise.

Figure 6:
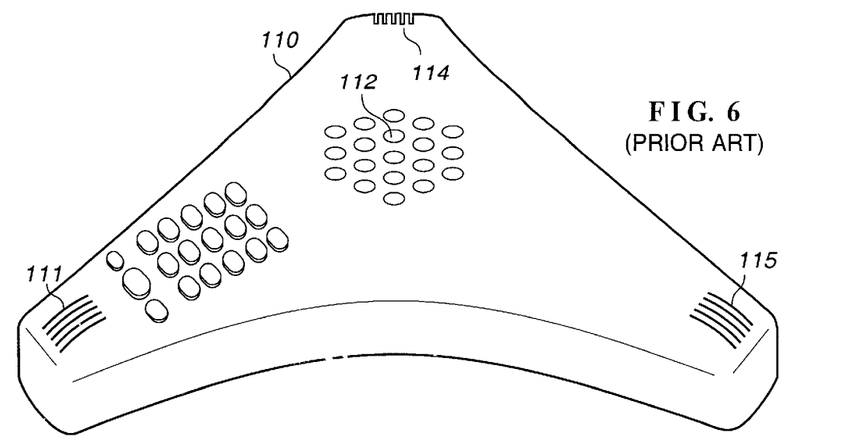
FIG. 6 is a perspective view of a contemporary conference telephone.

The invention finds use in many applications where the electronics is essentially the same but the external appearance of one device is different from another device. FIG. 6 illustrates a conference telephone or speaker phone such as found in business offices. Telephone 110 includes microphone 111 and speaker 112 in a sculpted case. Telephone 110 may include several microphones, such as microphones 114 and 115 to improve voice reception or to provide several inputs for echo rejection or noise rejection, as disclosed in U.S. Pat. No. 5,138,651 (Sudo).

Figure 7:
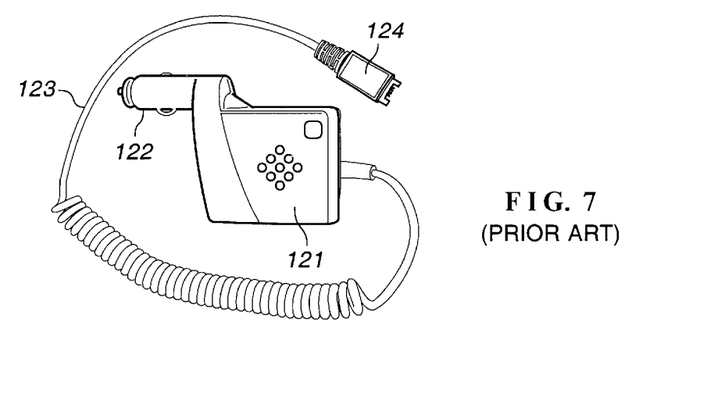
FIG. 7 illustrates what is known as a hands-free kit for mobile operation.
Figure 8:
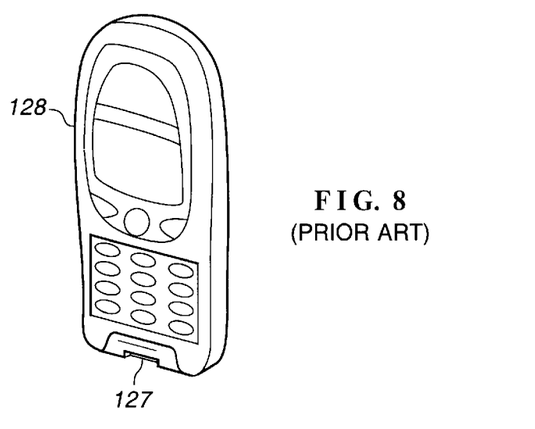
FIG. 8 illustrates a cellular telephone having a socket for a hands-free kit.

FIG. 7 illustrates what is known as a hands free kit for providing audio coupling to a cellular telephone, illustrated in FIG. 8. Hands free kits come in a variety of implementations but generally include powered speaker 121 attached to plug 122, which fits an accessory outlet or a cigarette lighter socket in a vehicle. A hands free kit also includes cable 123 terminating in plug 124. Plug 124 fits the headset socket on a cellular telephone, such as socket 127 (FIG. 8) in cellular telephone 128. Some kits use RF signals, like a cordless phone, to couple to a telephone. A hands free kit also typically includes a volume control and some control switches, e.g. for going "off hook" to answer a call. A hands free kit typically includes a lapel microphone (not shown) that plugs into the kit. Audio processing circuitry constructed in accordance with the invention can be included in a hands free kit, such as illustrated in FIG. 7, or in a cellular telephone, such as illustrated in FIG. 8.

Figure 9:
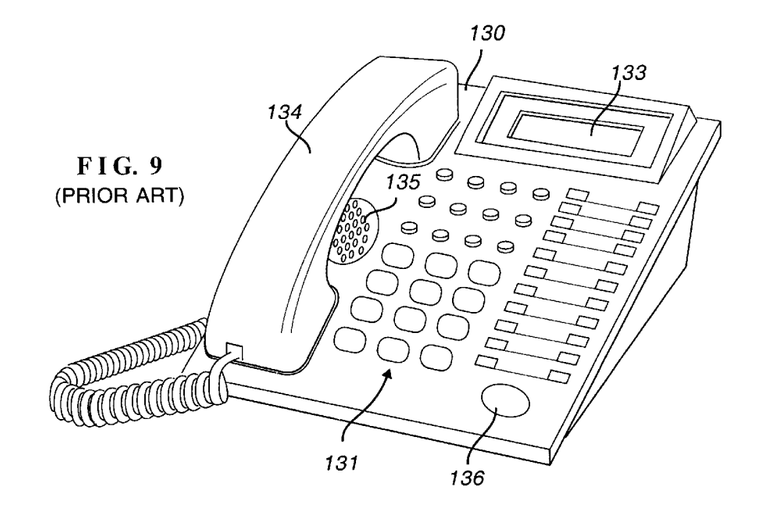
FIG. 9 illustrates a desk telephone with speaker capability.
Figure 10:
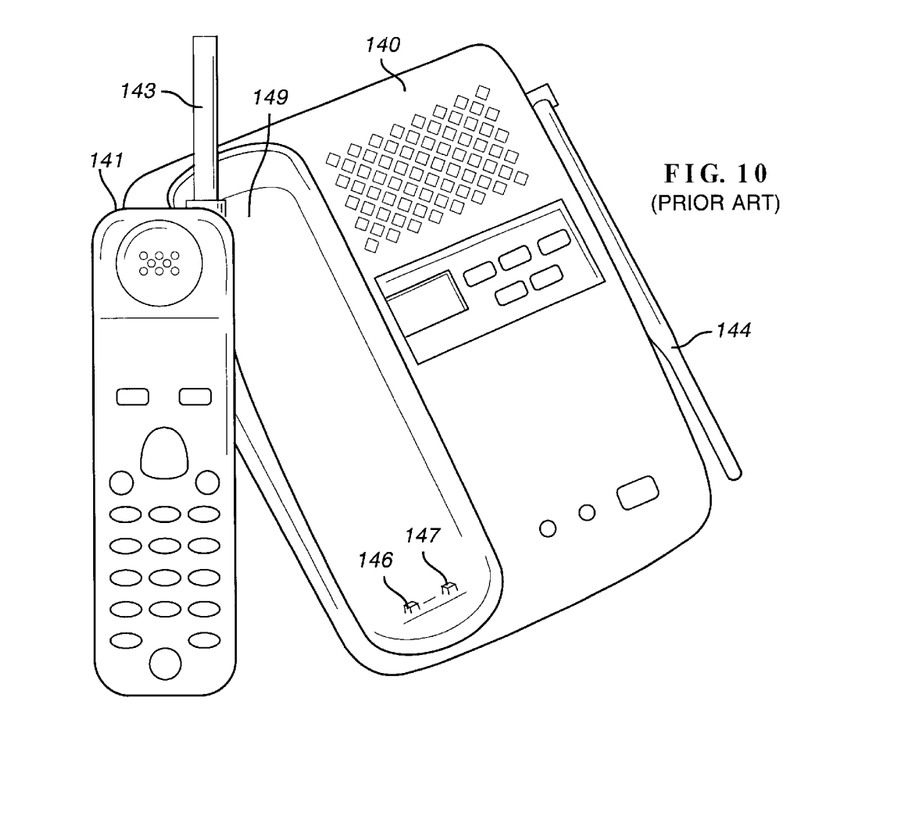
FIG. 10 illustrates a cordless telephone with speaker capability.

FIG. 9 illustrates a desk telephone including base 130, keypad 131, display 133 and handset 124. As illustrated in FIG. 9, the telephone has speaker phone capability including speaker 135 and microphone 136. The cordless telephone illustrated in FIG. 10 is similar except that base 140 and handset 141 are coupled by radio frequency signals, instead of a cord, through antennas 143 and 144. Power for handset 141 is supplied by internal batteries (not shown) charged through terminals 146 and 147 in base 140 when the handset rests in cradle 149.

Figure 11:
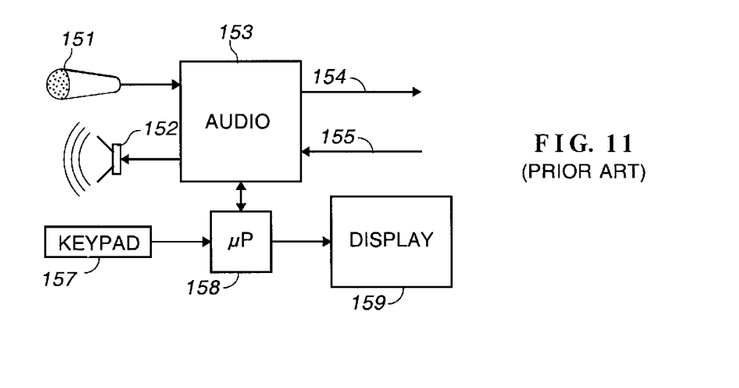
FIG. 11 is a block diagram of a telephone.

As noted above, these different forms of telephone can serve as conference telephones and benefit from the noise reduction provided by the invention. FIG. 11 is a generic block diagram of the audio portion of a conference telephone. Microphone 151 and speaker 152 are coupled to audio processing circuit 153. Line out 154 and line in 155 couple the audio processing circuit to the telephone system, either directly or through an RF modulator. Operation is controlled by microprocessor 158. The telephone also has a human interface including keypad 157 and typically including visual display 159. In a conference telephone, the invention is substituted in circuit 153 for a comb filter or for the alternative filter banks illustrated in FIG. 4 and FIG. 5.

Figure 12:
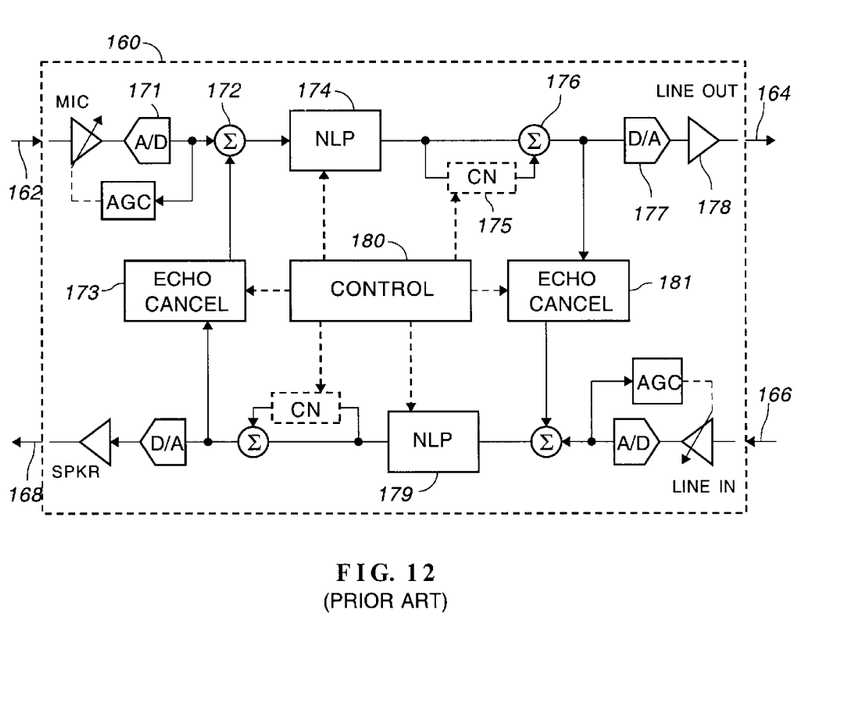
FIG. 12 is detailed block diagram of the echo canceling circuitry and some of the control circuitry in a telephone.

FIG. 12 is a detailed block diagram of a typical noise reduction and echo canceling circuit; e.g. see chapter 6 of *Digital Signal Processing in Telecommunications* by Shenoi, Prentice-Hall, 1995. The following describes signal flow through the transmit channel, from microphone input 162 to line output 164. The receive channel, from line input 166 to speaker output 168, works in the same way.

A new voice signal entering microphone input 162 may or may not be accompanied by a signal from speaker output 168. The signals from input 162 are digitized in 16-bit A/D converter 171 and coupled to summation network 172. There is, as yet, no signal from echo canceling circuit 173 and the data proceeds to nonlinear processor 174, which is initially set to minimum attenuation.

The output from nonlinear processor 174 is coupled to summation circuit 176, where comfort noise 175 is optionally added to the signal. The signal is then converted back to analog form by D/A converter 177, amplified in amplifier 178, and coupled to line output 164. The filter banks in each channel shown in FIGS. 1–3 are located in nonlinear processors 174 and 179. Control circuit 60 can be part of control 180 or separate; e.g. as when located in a hands free kit. Circuit 173 reduces acoustic echo and circuit 181 reduces line echo. The operation of these last two circuits is known per se in the art; e.g. as described in the above-identified text.

The invention thus provides a noise reducing circuit that retains the advantages of a complementary comb filter without the signal degradation and an improved technique for selectively attenuating bands in an audio communication system. The invention eliminates echo tails up to fifteen hundred milliseconds in length and can reduce both background noise and echo noise while maintaining full duplex communication. The invention can be implemented in either analog form or in digital form, although maintaining an analog voice signal is preferred because the operation of the circuit is faster.

Having thus described the invention, it will be apparent to those of skill in the art that many modification s can be made with the scope of the invention. For example, logic circuit 60 can be discrete logic, a programmable logic array (PLA), or a microprocessor having appropriate A/D conversion capability for receiving the signals from the detectors. The variable gain amplifiers can be digitally controlled amplifiers, thereby saving some conversion time. The thresholds for the bands need not be the same but can correspond to one or another curve representing the sensitivity of human hearing or to the hearing of a particular individual, for example. The variable gain amplifiers can provide gain or attenuation. The gain or attenuation can be linearly related to signal strength or non-linearly related to signal strength.

What is claimed as the invention is:

1. A method for processing two audio signals, said method comprising the steps of:
    applying a first audio signal to a first channel and a second audio signal to a second channel;
    dividing each channel into a plurality of bands;
    monitoring the amplitudes of the portions of the signals in all bands; and, for each band having a portion above a predetermined threshold:
        attenuating the portion in the corresponding band in the other channel, and
        preventing portions in adjacent bands in the other channel from being fully attenuated.

2. The method as set forth in claim 1 and further including the step of:
    for each band having a portion above a predetermined threshold, attenuating the portion in that band if at least one of the adjacent bands in the other channel is attenuated.

3. The method as set forth in claim 1 and further including the step of:

detecting the long term presence of noise in a band, and attenuating the portion in that band.

4. In a noise reducing circuit for processing a pair of audio signals in two channels, wherein each channel includes a plurality of band pass filters for dividing the signal in each channel into a plurality of bands and a summation network in each channel for re-combining the outputs of the band pass filters, the improvement comprising:

a plurality of threshold detectors coupled one each to the output of a band pass filter;

control logic coupled to the threshold detectors;

a plurality of variable gain amplifiers coupled one each to a band pass filter and to said control logic;

wherein said control logic reduces the gain of selected variable gain amplifiers in accordance with the outputs of the threshold detectors but does not fully reduce the gain of amplifiers in adjacent bands in a given channel.

5. The noise reducing circuit as set forth in claim 4 wherein said control logic reduces the gain of a variable gain amplifier in a band of one channel in accordance with the amplitude of a signal in the corresponding band in the other channel.

6. The noise reducing circuit as set forth in claim 4 wherein said control logic reduces the gain of a variable gain amplifier in a band of one channel in accordance with the amplitude of a signal in that band and in adjacent bands in said one channel, thereby reducing background noise.

7. A noise reducing circuit for processing audio signals comprising:

a plurality of band pass filters for dividing the signals into a plurality of bands;

a plurality of first detectors coupled one each to a band pass filter, each first detector having a long response time;

a plurality of variable gain amplifiers, each amplifier having an input coupled to a band pass filter, a control input, and an output;

a summation circuit coupled to the outputs of the variable gain amplifiers;

control logic coupled to said first detectors and to the control inputs of the variable gain amplifiers for preventing the signals in adjacent bands within a given channel from being fully attenuated simultaneously and for permitting the signals in adjacent bands within the given channel to be partially attenuated simultaneously.

8. The noise reduction circuit as set forth in claim 7 and further including a plurality of second detectors having a short response time, said second detectors coupled to the band pass filters and to said control logic.

9. In a conference telephone having an audio processing circuit including a noise reducing circuit for processing a pair of audio signals in two channels, wherein each channel includes a plurality of band pass filters for dividing the signal in each channel into a plurality of bands and a summation network for re-combining the outputs of the band pass filters, the improvement comprising:

a plurality of threshold detectors coupled one each to the output of a band pass filter;

control logic coupled to all the threshold detectors;

a plurality of variable gain amplifiers coupled one each to a band pass filter and to said control logic;

wherein said control logic reduces the gain of selected variable gain amplifiers in accordance with the outputs of all the threshold detectors but does not fully reduce the gain of amplifiers in adjacent bands in a given channel.

10. In a cellular telephone having an audio processing circuit including a noise reducing circuit for processing a pair of audio signals in two channels, wherein each channel includes a plurality of band pass filters for dividing the signal in each channel into a plurality of bands and a summation network for re-combining the outputs of the band pass filters, the improvement comprising:

a plurality of threshold detectors coupled one each to the output of a band pass filter;

control logic coupled to all the threshold detectors;

a plurality of variable gain amplifiers coupled one each to a band pass filter and to said control logic;

wherein said control logic reduces the gain of selected variable gain amplifiers in accordance with the outputs of all the threshold detectors but does not fully reduce the gain of amplifiers in adjacent bands in a given channel.

11. A hands free kit comprising:

an audio processing circuit for processing a pair of audio signals in two channels, wherein each channel includes a plurality of band pass filters for dividing the signal in each channel into a plurality of bands and a summation network in each channel for re-combining the outputs of the band pass filters;

a plurality of threshold detectors coupled one each to the output of a band pass filter;

control logic coupled to all the threshold detectors;

a plurality of variable gain amplifiers coupled one each to a band pass filter and to said control logic;

wherein said control logic reduces the gain of selected variable gain amplifiers in accordance with the outputs of all the threshold detectors but does not fully reduce the gain of amplifiers in adjacent bands in a given channel.

12. In a desk telephone having an audio processing circuit including a noise reducing circuit for processing a pair of audio signals in two channels, wherein each channel includes a plurality of band pass filters for dividing the signal in each channel into a plurality of bands and a summation network for re-combining the outputs of the band pass filters, the improvement comprising:

a plurality of threshold detectors coupled one each to the output of a band pass filter;

control logic coupled to all the threshold detectors;

a plurality of variable gain amplifiers coupled one each to a band pass filter and to said control logic;

wherein said control logic reduces the gain of selected variable gain amplifiers in accordance with the outputs of all the threshold detectors but does not fully reduce the gain of amplifiers in adjacent bands in a given channel.

* * * * *